United States Patent
Spencer et al.

(10) Patent No.: US 10,259,920 B2
(45) Date of Patent: Apr. 16, 2019

(54) CARBON FIBRE-CONTAINING PREPREGS

(71) Applicant: Gurit (UK) Ltd., Newport, Isle of Wight (GB)

(72) Inventors: Paul John Spencer, Southampton (GB); Glynn John Edwards, East Cowes (GB); Kate Victoria Redrup, Ryde (GB)

(73) Assignee: Gurit (UK) Ltd., Newport, Isle of Wight, Hampshire (GB)

( * ) Notice: Subject to any disclaimer, the term of this patent is extended or adjusted under 35 U.S.C. 154(b) by 218 days.

(21) Appl. No.: 14/891,436

(22) PCT Filed: May 16, 2014

(86) PCT No.: PCT/EP2014/060139
§ 371 (c)(1),
(2) Date: Nov. 16, 2015

(87) PCT Pub. No.: WO2014/184369
PCT Pub. Date: Nov. 20, 2014

(65) Prior Publication Data
US 2016/0083543 A1 Mar. 24, 2016

(30) Foreign Application Priority Data
May 17, 2013 (GB) .................................. 1308970.1

(51) Int. Cl.
| | | |
|---|---|---|
| *B32B 27/38* | (2006.01) | |
| *B32B 27/26* | (2006.01) | |
| *B32B 27/18* | (2006.01) | |
| *B32B 27/04* | (2006.01) | |
| *C08J 5/24* | (2006.01) | |
| *C08G 59/40* | (2006.01) | |
| *C08J 5/04* | (2006.01) | |
| *C08J 5/10* | (2006.01) | |
| *C08G 59/46* | (2006.01) | |
| *C08G 59/68* | (2006.01) | |
| *C08L 63/00* | (2006.01) | |
| *C08L 63/04* | (2006.01) | |
| *C08G 59/32* | (2006.01) | |

(52) U.S. Cl.
CPC ............ *C08J 5/24* (2013.01); *C08G 59/4021* (2013.01); *C08G 59/46* (2013.01); *C08G 59/686* (2013.01); *C08J 5/042* (2013.01); *C08J 5/10* (2013.01); *C08J 2363/00* (2013.01); *C08J 2363/04* (2013.01); *C08J 2471/00* (2013.01)

(58) Field of Classification Search
None
See application file for complete search history.

(56) References Cited

U.S. PATENT DOCUMENTS

| | | | |
|---|---|---|---|
| 4,912,190 A | 3/1990 | Schafer | |
| 6,399,199 B1 * | 6/2002 | Fujino | ........................ C08J 5/24 |
| | | | 428/293.4 |
| 2008/0308972 A1 * | 12/2008 | Fanget | ............... C08G 59/5026 |
| | | | 264/328.1 |
| 2013/0323429 A1 | 12/2013 | Strobel et al. | |
| 2014/0024741 A1 | 1/2014 | Strobel et al. | |

FOREIGN PATENT DOCUMENTS

| | | | |
|---|---|---|---|
| AT | 351772 B | 8/1979 | |
| DE | 2743015 A1 | 4/1979 | |
| DE | 4217509 A1 | 12/1993 | |
| JP | 2008-088277 A * | 4/2008 | .............. C08L 63/00 |
| WO | 2011015611 A1 | 2/2011 | |
| WO | 2012113878 A1 | 8/2012 | |
| WO | 2012113879 A1 | 8/2012 | |
| WO | 20120131009 A1 | 10/2012 | |

OTHER PUBLICATIONS

Machine translation of JP 2008-088277 A (no date).*
Search Report and Written Opinion dated Aug. 1, 2014 in Int'l. Patent Appln. No. PCT/EP2014/060139.
Third party observations filed Jun. 7, 2016 in corresponding application GB2514198A1.
Examination Report under Section 18(3) and Observations under Section 21 dated Sep. 29, 2016 in corresponding application GB1308070.1.
Ehrenstein, G.B., Faser-Verbundstoffe, 2006, second edition, chapter 5, pp. 148ff; chapter 5, pp. 148-208 (partial Engl. translation).

* cited by examiner

*Primary Examiner* — Michael J Feely
(74) *Attorney, Agent, or Firm* — Polsinelli, PC

(57) ABSTRACT

A prepreg comprising at least one layer of carbon fibers and a curable thermosetting resin system, the curable thermosetting resin system at least partly impregnating the at least one layer of carbon fibers, wherein the curable thermosetting resin system comprises:
  a. a curable thermosetting resin including at least one epoxide group;
  b. a curing agent for curing the curable thermosetting resin, wherein the curing agent is present in the liquid phase and includes a cyanamide reactive group;
  c. an accelerator for accelerating the curing of the thermosetting resin by the curing agent, wherein the accelerator includes at least one urea reactive group; and
  d. a rheology modifier for the curable thermosetting resin system, wherein the rheology modifier is at least one of a thermoplastic resin and an inorganic particulate thickener or a mixture thereof.

25 Claims, 2 Drawing Sheets

CARBON FIBRE-CONTAINING PREPREGS

FIELD OF THE INVENTION

The present invention relates to prepregs comprising at least one layer of carbon fibres and a curable thermosetting resin system, to a method of producing carbon fibre reinforced resin matrix composite material and to the use of a curing system in a prepreg comprising at least one layer of carbon fibres and a curable thermosetting resin system.

BACKGROUND

Carbon fibre composite materials are commonly employed in high cost/high performance applications where light-weight structures are required. For many applications, coupled with the high mechanical performance of carbon fibre composite materials is the unique visual appearance of carbon fibre composite laminates, in particular those using woven carbon fabrics. Such an aesthetic appearance of carbon fibres is highly desirable, and carbon fibre composite materials find many applications in high-value markets such as automotive components, luxury yachts and consumer electronics where the visual appearance of the carbon fibres as well as the technical performance of the composite material is important to the user/consumer. For these so-called "cosmetic" applications of carbon fibre composite materials, the visual aspect of the cured laminate needs to be of high quality and free from imperfections such as discontinuous fibres, particle contamination and surface effects, for example pin holes, fish eyes, blisters, etc.

Historically for the manufacture of cosmetic quality laminates, carbon fibre prepregs are used. The prepregs comprise at least one layer of carbon fibres and a curable thermosetting resin system, typically an epoxy resin. The thermosetting resin in these prepregs is typically cured using dicyandiamide-based catalysis. Dicyandiamide is added as a powder to the curable resin. The solubility of dicyandiamide in commonly employed resin chemistries is generally poor. Therefore, after cure, residual particles of dicyandiamide are frequently observed in areas of high resin content. To reduce this effect, the prepreg user is required to use low resin content prepregs and careful processing. These both introduce disadvantageous aspects to the component manufacture and do not fully mitigate the defects described.

Whilst it has been historically possible to employ liquid curing compounds such as imidazoles in order to achieve clear cured resins, such curing compounds have technical disadvantages such as short latency (leading to significantly reduced shelf life of the uncured prepreg), increased cost, and, depending on the chemistry used, often reduced thermal-mechanical properties and panel clarity, exhibited by excessive resin colour and opacity.

There is therefore currently a need in the art for a carbon fibre prepreg which includes a thermosetting resin system which not only provides a high quality processing, with a high latency of the curing system and a controlled curing, but also provides a combination of high quality thermo-mechanical properties and visual appearance.

WO-A-2012/113878 and WO-A-2012/113878 disclose liquid curing agents for thermosetting resins.

SUMMARY OF THE INVENTION

The present invention aims to provide a carbon fibre prepreg which can readily be used in "cosmetic" applications and which can exhibit highly clear cured resin matrices, allowing a high quality visual appearance of the carbon fibres, with zero visible catalyst particles.

The present invention aims to provide a carbon fibre prepreg which can provide a high quality visual appearance of the carbon fibres, combined with good resin processing and high latency.

The present invention accordingly provides a prepreg comprising at least one layer of carbon fibres and a curable thermosetting resin system, the curable thermosetting resin system at least partly impregnating the at least one layer of carbon fibres, wherein the curable thermosetting resin system comprises:

a. a curable thermosetting resin including at least one epoxide group;
b. a curing agent for curing the curable thermosetting resin, wherein the curing agent is present in the liquid phase and includes a cyanamide reactive group;
c. an accelerator for accelerating the curing of the thermosetting resin by the curing agent, wherein the accelerator includes at least one urea reactive group; and
d. a rheology modifier for the curable thermosetting resin system, wherein the rheology modifier is at least one of a thermoplastic resin and an inorganic particulate thickener or a mixture thereof.

Optionally, the curing agent comprises cyanamide of formula $NC-NH_2$.

Optionally, the accelerator comprises a substituted or unsubstituted urea of formula $R_1R_2-N-CO-NR_3R_4$, where $R_1$ is hydrogen or any substituted or unsubstituted aliphatic group, $R_2$ is hydrogen or any substituted or unsubstituted aliphatic, $R_3$ is hydrogen or any substituted or unsubstituted aliphatic or aromatic group, and $R_4$ is hydrogen or any substituted or unsubstituted aliphatic or aromatic group.

Further optionally, in the urea of formula $R_1R_2-N-CO-NR_3R_4$, $R_1$ and $R_2$ are methyl groups, $R_3$ is hydrogen, and $R_4$ is a substituted or unsubstituted aromatic group.

Preferably, the urea is a di-urea and $R_4$ is a urea-substituted aromatic group.

Typically, the accelerator comprises

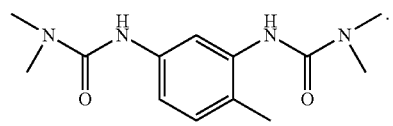

Optionally, the cyanamide curing agent and the urea accelerator are present in the curable thermosetting resin system in a molar ratio of from 1:5 to 1:20, further optionally from 1:10 to 1:15.

Optionally, the cyanamide curing agent and the urea accelerator are present in the curable thermosetting resin system in a weight ratio of from 2:1 to 1:10, further optionally from 1.5:1 to 1:7.5.

Optionally, the curable thermosetting resin is selected from at least one of an epoxy novolac resin, an epoxy cresol novolac resin and an epoxy phenol novolac resin, or a mixture of any two or more thereof.

Optionally, the curable thermosetting resin has an epoxy equivalent weight of from 230 to 250 g/equivalent weight.

Optionally, the curable thermosetting resin has a viscosity of from 80 to 90 Poise at a temperature of 85° C.

Optionally, the thermoplastic resin of the rheology modifier has a softening point within the range of from 170 to 190° C., further optionally from 175 to 185° C., yet further optionally about 180° C.

Optionally, the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof.

Optionally, the curable thermosetting resin and the thermoplastic resin of the rheology modifier are present in a weight ratio of from 90:10 to 99:1, further optionally from 93:7 to 97:3, optionally about 95:5.

Optionally, the inorganic particulate thickener comprises fumed silica.

Optionally, the weight ratio of (i) the combination of the curable thermosetting resin and the thermoplastic resin of the rheology modifier; and (ii) the combination of the curing agent including the cyanamide reactive group and the accelerator including the urea reactive group; is from 100:5 to 100:18, further optionally from 100:10 to 100:15, yet further optionally about 100:12.

The present invention further provides a prepreg comprising at least one layer of carbon fibres and a curable thermosetting resin system, the curable thermosetting resin system at least partly impregnating the at least one layer of carbon fibres, wherein the curable thermosetting resin system comprises:
a curable thermosetting resin including at least one epoxide group;
a curing agent for curing the curable thermosetting resin, wherein the curing agent includes a cyanamide constituent which is present in the liquid phase; and
an accelerator for accelerating the curing of the thermosetting resin by the curing agent, wherein the accelerator includes at least one urea reactive group;
wherein the curing agent and the accelerator are formulated to remain in the liquid phase prior to curing of the thermosetting resin so as to avoid the presence of particles of curing agent as a separate phase within the cured thermoset resin system, and wherein the thermosetting resin system is formulated to have a minimum viscosity during curing of from 6 to 18 Pa·s at a temperature of from 95 to 105° C.

Optionally, the thermosetting resin system is formulated to have a minimum viscosity of from 10 to 14 Pa·s at a temperature of from 97 to 101° C., further optionally from 12 to 12.5 Pa·s at a temperature of from 98 to 100° C.

Optionally, the thermosetting resin system is formulated to have curing reactivity so that the viscosity of the thermosetting resin system is above 10000 Pa·s at any temperature within the range of from 112 to 118° C., further optionally so that the viscosity of the thermosetting resin system is above 10000 Pa·s throughout the temperature range of from 115 to 118° C.

Optionally, the curable thermosetting resin has a viscosity of from 80 to 90 Poise at a temperature of 85° C.

The present invention further provides a method of producing carbon fibre reinforced resin matrix composite material, the method comprising the steps of:
providing a laminated stack of prepregs, each prepreg comprising at least one layer of carbon fibres and a curable thermosetting resin system, the curable thermosetting resin system at least partly impregnating the at least one layer of carbon fibres, wherein the curable thermosetting resin system comprises: a curable thermosetting resin including at least one epoxide group; a curing agent for curing the curable thermosetting resin, wherein the curing agent includes a cyanamide constituent which is present in the liquid phase; and an accelerator for accelerating the curing of the thermosetting resin by the curing agent, wherein the accelerator includes at least one urea reactive group;
heating up the laminated stack of prepregs to cause the curable thermosetting resin system to flow and fully impregnate the carbon fibres and to cure to form a cured thermoset resin matrix; wherein the curing agent and the accelerator are formulated to remain in the liquid phase prior to curing of the thermosetting resin so as to avoid the presence of particles of curing agent as a separate phase within the cured thermoset resin system, and wherein the thermosetting resin system is formulated to have a minimum viscosity during curing of from 6 to 18 Pa·s at a temperature of from 95 to 105° C.

Optionally, the thermosetting resin system is formulated to have a minimum viscosity of from 10 to 14 Pa·s at a temperature of from 97 to 101° C., further optionally from 12 to 12.5 Pa·s at a temperature of from 98 to 100° C.

Optionally, the thermosetting resin system is formulated to have curing reactivity so that the viscosity of the thermosetting resin system is above 10000 Pa·s at any temperature within the range of from 112 to 118° C., further optionally so that the viscosity of the thermosetting resin system is above 10000 Pa·s throughout the temperature range of from 115 to 118° C.

Optionally, during the heating step the laminated stack of prepregs is heated from ambient temperature up to a curing temperature of from 115 to 125° C. at a ramp rate of from 0.5 to 2° C./minute and held at the curing temperature for a period of at least 15 minutes.

Optionally, during the heating step the laminated stack of prepregs is heated from ambient temperature up to a curing temperature of from 118 to 122° C. at a ramp rate of from 0.75 to 1.5° C./minute and held at the curing temperature for a period of at least 30 minutes.

Optionally, during the heating step the curable thermosetting resin has a viscosity of from 80 to 90 Poise at a temperature of 85° C.

The present invention further provides the use, in a prepreg comprising at least one layer of carbon fibres and a curable thermosetting resin system, the curable thermosetting resin system at least partly impregnating the at least one layer of carbon fibres and comprising a curable thermosetting resin including at least one epoxide group, of a curing system comprising a liquid phase curing agent which includes a cyanamide reactive group and an accelerator which includes at least one urea reactive group, for avoiding a visible residue of particles of curing agent in a carbon fibre reinforced resin matrix composite material produced from the prepreg.

The present invention is at least partly predicated on the finding by the present inventors that using an alternative catalyst/curing compound to dicyandiamide, in the form of a liquid curing agent with similar chemical functional groups, together with a urea accelerator, it is possible to formulate a prepreg resin system with similar handling, curing and thermal-mechanical properties as dicyandiamide based prepregs, yet remove or avoid any presence of insoluble particles, thereby significantly improving the surface finish of the resultant cured composite material components.

The present invention has particular application to the formulation of carbon fibre prepregs where the final cured laminate is desired to have a high quality surface finish, for example for unpainted carbon fibre finish components. These are common place in high-value consumer applications such as niche cars, luxury yachts, and high-end consumer electronics.

The prepregs of the preferred embodiments of the present provide a number of technical advantages over known carbon fibre prepregs, and are formulated to provide not only enhanced mechanical properties but also aesthetic properties as a result of the carbon fibres being visible to the consumer/user through a clear resin matrix.

In particular, the processing of carbon fibre prepregs of the preferred embodiments can be less sensitive to resin content, tool design and laminate processing as compared to known prepregs.

As compared to the use of particulate dicyandiamide curing agent, the "scrap" rate of cosmetic components due to presence of visible particles can be reduced to zero, which provides a significant cost saving to the manufacture of the composite material components.

Higher resin content prepregs can be used, if required, as compared to the resin content which could be used for cosmetic carbon products incorporating particulate dicyandiamide curing agent, the latter typically and conventionally having a resin content kept low, at typically <40% by weight relative to the total prepreg weight, to ensure that the presence of any insoluble curing agent particles was minimised.

The prepreg of the preferred embodiments of the invention is more tolerant to varied processing and cure temperatures than when using particulate dicyandiamide curing agent. Typically and conventionally the cure profile of prepregs comprising particulate dicyandiamide curing agent for cosmetic applications needed to be carefully controlled to ensure optimal dissolution of any catalyst or accelerator particles present in the resin matrix. The combined curing agent/accelerator system employed in the resent invention can permit readily controllable curing conditions to be implemented, ensuring the reliable industrial production of composite materials which exhibit the combination of high quality mechanical and aesthetic properties.

BRIEF DESCRIPTION OF THE FIGURES

Embodiments of the present invention will now be described by way of example only with reference to the accompanying drawings, in which.

DETAILED DESCRIPTION

Figure 1:
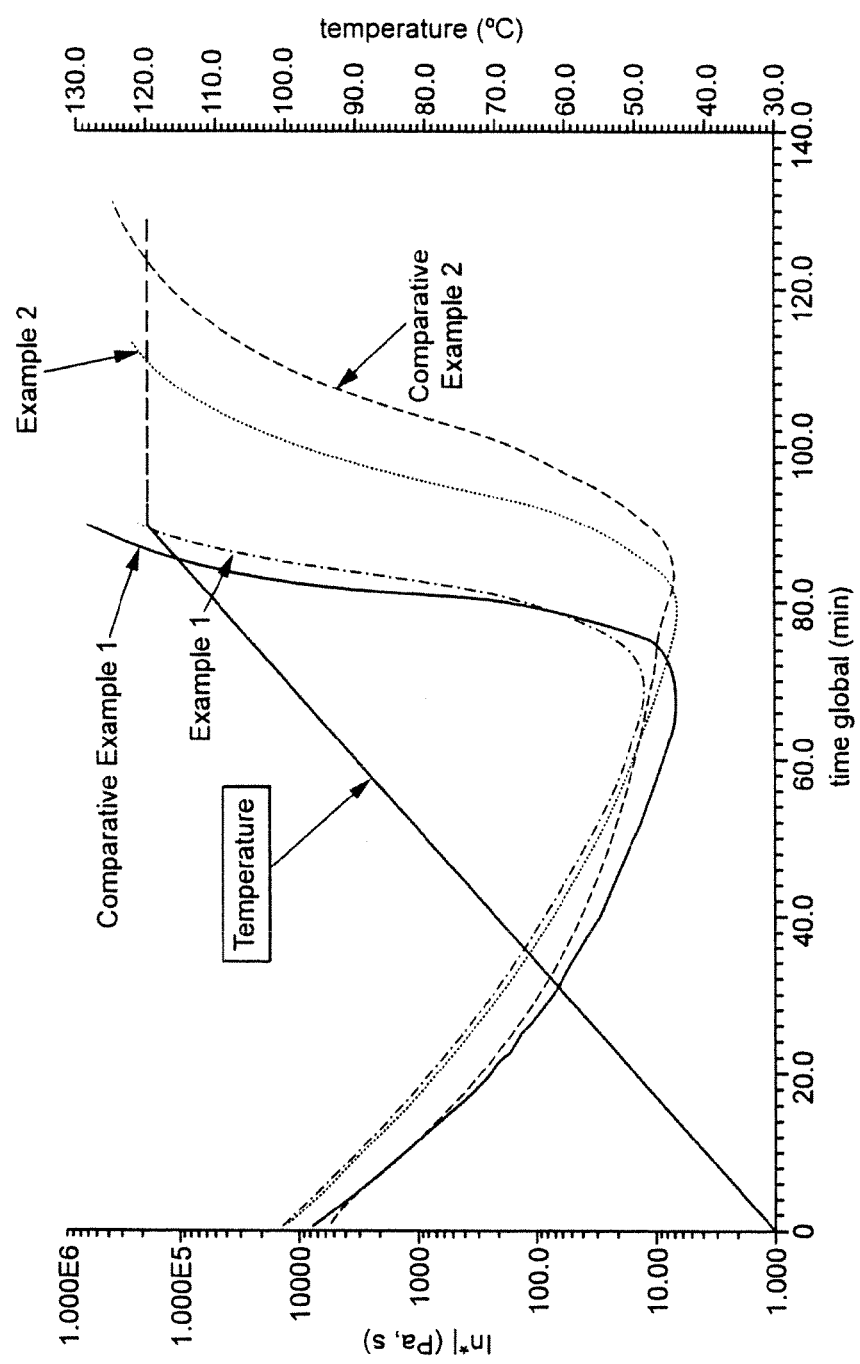
FIG. 1 is a graph showing the relationship between viscosity and time, and temperature and time, for a number of thermosetting resin systems according to Examples of the present invention and according to Comparative Examples not in accordance with the present invention.

In accordance with preferred embodiments of the present invention, there is provided a prepreg. The prepreg comprises at least one layer of carbon fibres and a curable thermosetting resin system.

The carbon fibres may be present in any form known to those skilled in the art, and typically are present in the form of a woven fabric. Various weave patterns and fabric weights may be employed, in accordance with the common general knowledge of the skilled person. The carbon fibres may have a uniaxial, biaxial or multiaxial fibre orientation, as is well known to those skilled in the art.

The curable thermosetting resin system at least partly impregnates the at least one layer of carbon fibres. Typically, the curable thermosetting resin system fully impregnates the at least one layer of carbon fibres. Alternatively, a "semi-preg" prepreg structure may be provided, in which a layer of the resin is adjacent to a layer of carbon fibres. In either prepreg construction, during the curing step the resin is heated and is consequently lowered in viscosity so as to flow and fully to wet out the fibres and form a coherent resin matrix surrounding the fibres prior to curing of the resin.

The curable thermosetting resin system of the preferred embodiments comprises four components:
a. a curable thermosetting resin including at least one epoxide group;
b. a curing agent for curing the curable thermosetting resin, wherein the curing agent is present in the liquid phase and includes a cyanamide reactive group;
c. an accelerator for accelerating the curing of the thermosetting resin by the curing agent, wherein the accelerator includes at least one urea reactive group; and
d. a rheology modifier for the curable thermosetting resin system, wherein the rheology modifier is at least one of a thermoplastic resin and an inorganic particulate thickener or a mixture thereof.

As discussed below, in certain embodiments the rheology modifier may be omitted.

The curable thermosetting resin is typically selected from at least one of an epoxy novolac resin, an epoxy cresol novolac resin and an epoxy phenol novolac resin, or a mixture of any two or more thereof. Typically, the epoxy resin has an epoxy equivalent weight of from 230 to 250 g/equivalent weight. The epoxy resin, and the associated curing agent and accelerator, may be formulated so that the epoxy resin is to be cured at various curing temperatures. A typical curing temperature is 120° C., although other curing temperatures may be employed. The cured epoxy resin may be formulated to have a desired glass transition temperature, Tg, as known to those skilled in the art. Typically, the epoxy resin has a Tg of from 100 to 120° C. A particular curable thermosetting resin for use in the invention typically has a viscosity of from 80 to 90 Poise at a temperature of 85° C., although lower or higher resin viscosities may be employed and may be a function of different resin curing temperatures.

The curable thermosetting resin is typically blended with the rheology modifier, although in some embodiments no such rheology modifier is present in the curable thermosetting resin system. As stated above, the rheology modifier is typically at least one of a thermoplastic resin and an inorganic particulate thickener or a mixture thereof. The rheology modifier provides the required drape, handling properties and mechanical properties for the particular application of the prepreg to be moulded. In some embodiments, the drape properties may be provided by the curable thermosetting resin, thereby obviating the need for a rheology modifier.

Typically, when the rheology modifier is a thermoplastic resin, the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof. Most typically, the thermoplastic resin is a phenoxy resin, such as a phenoxy resin available in powder form under the trade name InChemRez PKHP-200 available in commerce from InChem Corporation. Typically the thermoplastic resin of the rheology modifier has a softening point within the range of from 170 to 190° C., further optionally from 175 to 185° C., yet further optionally about 180° C., for example as provided by the InChemRez PKHP-200 product.

The weight ratio of the curable thermosetting resin and the thermoplastic resin of the rheology modifier is controlled so as to provide the desired drape, handling and mechanical properties to the prepreg. For example, the resin portion of the curable thermosetting resin system, namely the curable thermosetting resin and the thermoplastic resin of the rheology modifier, may typically include about 95 wt % of the base thermosetting resin, for example epoxy resin. Optionally, the curable thermosetting resin and the thermoplastic resin of the rheology modifier are present in a weight ratio of from 90:10 to 99:1, further optionally from 93:7 to 97:3, yet further optionally about 95:5.

As well as or instead of a thermoplastic resin rheology modifier, the rheology modifier may comprise an inorganic particulate thickener, such as fumed silica. Other inorganic particulate thickeners are known in the art and may be employed in the invention.

In each embodiment, the composition and amount of the rheology modifier(s) may readily be selected based on the desired drape properties of the prepreg during layup of the prepreg into a mould, and also selected based on the desired flow properties of the curable thermosetting resin system during the curing step at elevated temperature.

The curing agent used in accordance with the present invention is in the form of a liquid and so has no particles. Furthermore, in particular when combined with a suitable accelerator, the curing agent is reactive enough to cure within a desired cure schedule, defined by time and temperature. The curing agent also has latency to provide storage stability for the prepreg material.

For achieving the desired properties of the cured thermoset resin, the curing agent should be used in a suitable ratio together with the curable thermoset resin, e.g. epoxy novolac resin, as discussed above. The active hydrogen equivalent weight of the curing agent and the epoxy equivalent weight of the selected resin are used to determine the ideal mix ratio, as known to those skilled in the art. For some desired cure schedules, the accelerator is also required in order to ensure that the material cures within the desired schedule and also in order to control the resin flow properties prior to resin gelation during prepreg resin curing to form the composite material during manufacture.

There are numerous other liquid curing agents that could be used for the purpose of the curing the resin formulation. These include many amines and imidazoles. However, these result in a number of drawbacks for the required application, meaning that they were not selected for use within the resin formulation according to the preferred embodiments of the present invention. For example, many amines and imidazoles exhibit poor shelf-life when mixed with resin. Imidazoles also commonly result in final products that are very dark in colour, which would be detrimental within a visual quality product. They also frequently cause a reduction in mechanical properties when compared with other curing agents.

Typically, the curing agent comprises cyanamide of formula $NC-NH_2$. The cyanamide curing agent may be provided as a liquid curing agent commercially available under the trade name of Dyhard VP111 by AlzChem AG, Germany.

By using the accelerator for the resin curing, resin flow during the temperature ramp stage of the cure cycle prior to gelation can be readily controlled. Furthermore, the curing can be controlled over a range of cure schedules. In addition, the properties of the final cured epoxy resin in the composite material can be controlled.

Typically, the accelerator comprises a substituted or unsubstituted urea of formula $R_1R_2-N-CO-NR_3R_4$, where $R_1$ is hydrogen or any substituted or unsubstituted aliphatic group, $R_2$ is hydrogen or any substituted or unsubstituted aliphatic, $R_3$ is hydrogen or any substituted or unsubstituted aliphatic or aromatic group, and $R_4$ is hydrogen or any substituted or unsubstituted aliphatic or aromatic group.

More typically, in the urea of formula $R_1R_2-N-CO-NR_3R_4$, $R_1$ and $R_2$ are methyl groups, $R_3$ is hydrogen, and $R_4$ is a substituted or unsubstituted aromatic group.

Preferably, the urea is a di-urea and $R_4$ is a urea-substituted aromatic group.

The urea may be a urea accelerator available in commerce under the trade name Amicure UR2T from Air Products and Chemicals, Inc., USA. The Amicure UR2T accelerator is a di-urea with an aromatic group bonded between opposed —NH groups of respective urea-functional moieties and has the following formula:

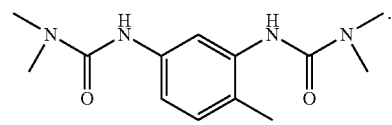

Alternatively, but less preferably, the urea may be a urea accelerator available in commerce under the trade name Dyhard UR800 from AlzChem AG. The Dyhard UR800 accelerator is a di-urea with an aliphatic group bonded between opposed —NH groups of respective urea-functional moieties and has the following formula:

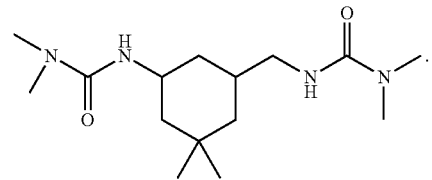

For the urea accelerator within the preferred formulation, it is desirable that it is latent at ambient temperatures, thus allowing good shelf-life of the mixed, uncured product under ambient conditions. Ureas other than Amicure UR2T can be used but these may reduce either the reactivity of the mixed system during cure, resulting in excess resin flow out of the prepreg, reduced cure conversion and lower cured properties, or may have the opposite effect. The urea accelerator, in combination with the respective curing agent, is therefore selected based on the cure schedule, and the desired final properties of the composite material.

The curing agent and the accelerator provide a composite cure system for the curable thermosetting resin. Typically, the cyanamide curing agent and the urea accelerator are present in the curable thermosetting resin system in a molar ratio of from 1:5 to 1:20, further optionally from 1:10 to 1:15.

Typically, the cyanamide curing agent and the urea accelerator are present in the curable thermosetting resin system in a molar ratio of from 1:5 to 1:20, further optionally from 1:10 to 1:15 and/or the cyanamide curing agent and the urea accelerator are present in the curable thermosetting resin system in a weight ratio of from 2:1 to 1:10, further optionally from 1.5:1 to 1:7.5.

Typically, the weight ratio of (i) the combination of the curable thermosetting resin and the thermoplastic resin of the rheology modifier and (ii) the combination of the curing agent including the cyanamide reactive group and the accelerator including the urea reactive group is from 100:5 to 100:18, further optionally from 100:10 to 100:15, yet further optionally about 100:12.

When formulating the curable thermosetting resin system, the base epoxide-containing resin and the thermoplastic resin rheology modifier are blended to form the overall resin constituent of the formulation and the curing agent and accelerator are mixed together to form the catalyst paste. The catalyst paste can be either with or without a carrier. Typically, no carrier is required. The overall resin constituent and the catalyst paste are mixed together in the desired ratio prior to impregnation of the carbon fibres during manufacture of the prepreg. The curable thermosetting resin composition is permitted to partly cure to the desired B-stage so as to provide the required drape properties of the resin prior to use in a moulding process to form a composite material. The moulding process is typically conducted under a negative pressure provided by a vacuum, but alternatively may be conducted under an elevated positive pressure in an autoclave.

In an example according to the invention, the catalyst paste comprised 75 wt % Dyhard Fluid VP111 curing agent and 25% Amicure UR2T accelerator. The catalyst paste was combined with the base resin portion, comprising the epoxy resin and thermoplastic resin rheology modifier, to provide a mix ratio of 100 parts by weight base resin/rheology modifier blend to 12 parts catalyst paste.

The present invention further provides a method of producing carbon fibre reinforced resin matrix composite material for the prepregs of the invention.

In the method, a laminated stack of prepregs is provided. The stack is typically laid up in or on a mould, so that the resultant composite material has the desired shape, configuration and dimensions. Then the stack of prepregs is typically subjected to vacuum moulding, in which the prepreg stack is maintained in a vacuum throughout the curing cycle. The vacuum removes interlaminar and intralaminar air so as to reduce the void volume of the resultant moulded composite material product. Alternatively, an autoclave moulding process may be employed. Still further, the composite material product may be moulded by press moulding the multilaminar stack of prepregs.

Each prepreg comprises at least one layer of carbon fibres and a curable thermosetting resin system. The curable thermosetting resin system at least partly impregnates the at least one layer of carbon fibres. The curable thermosetting resin system comprises: a curable thermosetting resin including at least one epoxide group; a curing agent for curing the curable thermosetting resin, wherein the curing agent includes a cyanamide constituent which is present in the liquid phase; and an accelerator for accelerating the curing of the thermosetting resin by the curing agent, wherein the accelerator includes at least one urea reactive group. As discussed above, a rheology modifier may optionally be present.

In the mould, the laminated stack of prepregs is heated up to cause the curable thermosetting resin system to flow and fully impregnate the carbon fibres and to cure to form a cured thermoset resin matrix.

The curing agent and the accelerator are formulated to remain in the liquid phase prior to curing of the thermosetting resin so as to avoid the presence of particles of curing agent as a separate phase within the cured thermoset resin system. In addition, the thermosetting resin system is formulated to have a minimum viscosity during curing of from 6 to 18 Pa·s at a temperature of from 95 to 105° C.

Typically, the thermosetting resin system is formulated to have a minimum viscosity of from 10 to 14 Pa·s at a temperature of from 97 to 101° C., further optionally from 12 to 12.5 Pa·s at a temperature of from 98 to 100° C.

Typically, the thermosetting resin system is formulated to have curing reactivity so that the viscosity of the thermosetting resin system is above 10000 Pa·s at any temperature within the range of from 112 to 118° C., further optionally so that the viscosity of the thermosetting resin system is above 10000 Pa·s throughout the temperature range of from 115 to 118° C.

Optionally, during the heating step the laminated stack of prepregs is heated from ambient temperature (typically 20° C.) up to a curing temperature of from 115 to 125° C. at a ramp rate of from 0.5 to 2° C./minute and held at the curing temperature for a period of at least 15 minutes. Typically, during the heating step the laminated stack of prepregs is heated from ambient temperature up to a curing temperature of from 118 to 122° C. at a ramp rate of from 0.75 to 1.5° C./minute and held at the curing temperature for a period of at least 30 minutes.

Optionally, during the heating step the curable thermosetting resin has a viscosity of from 80 to 90 Poise at a temperature of 85° C.

The present invention will now be illustrated in greater detail with reference to the following non-limiting Examples.

Example 1

An epoxy novolac resin available in commerce from Gurit (UK) Limited under the trade name SPX8642 was provided. This had an epoxy equivalent weight of 239 g/eq.

The epoxy resin was blended with a phenoxy thermoplastic resin available in commerce from InChem Corporation under the trade name PKHP-200 at a weight ratio of 95 wt % epoxy novolac resin:5 wt % phenoxy thermoplastic resin. This formed a resin blend.

A catalyst paste was prepared which comprised 75 wt % Dyhard Fluid VP111 curing agent and 25 wt % Amicure UR2T accelerator. The Amicure UR2T accelerator is a di-urea with an aromatic group bonded between opposed —NH groups of respective urea-functional moieties and has the following formula:

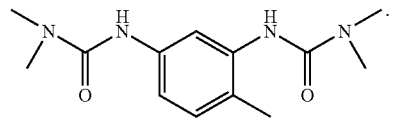

The resin blend and the catalyst paste were mixed in a weight ratio of 100 parts resin blend to 12 parts catalyst paste to form the curable epoxy resin composition for incorporation into a carbon fibre prepreg.

The curable resin was subjected to a curing schedule, which simulated a curing schedule to be used for making moulded composite material products using the prepregs, of heating from ambient temperature at a ramp rate of 1° C./min to a curing temperature of 120° C. and holding at 120° C. for a period of 1 hour. It was found that there was satisfactory curing within the required time frame, at the required temperatures and also resulted in satisfactory mechanical properties of the resultant cured resin.

FIG. 1 shows the relationship between viscosity (left-hand y-axis) and time (x-axis) during the curing schedule. The temperature profile (right-hand y-axis), indicating the ramp rate and the dwell period, is also shown.

Figure 2:
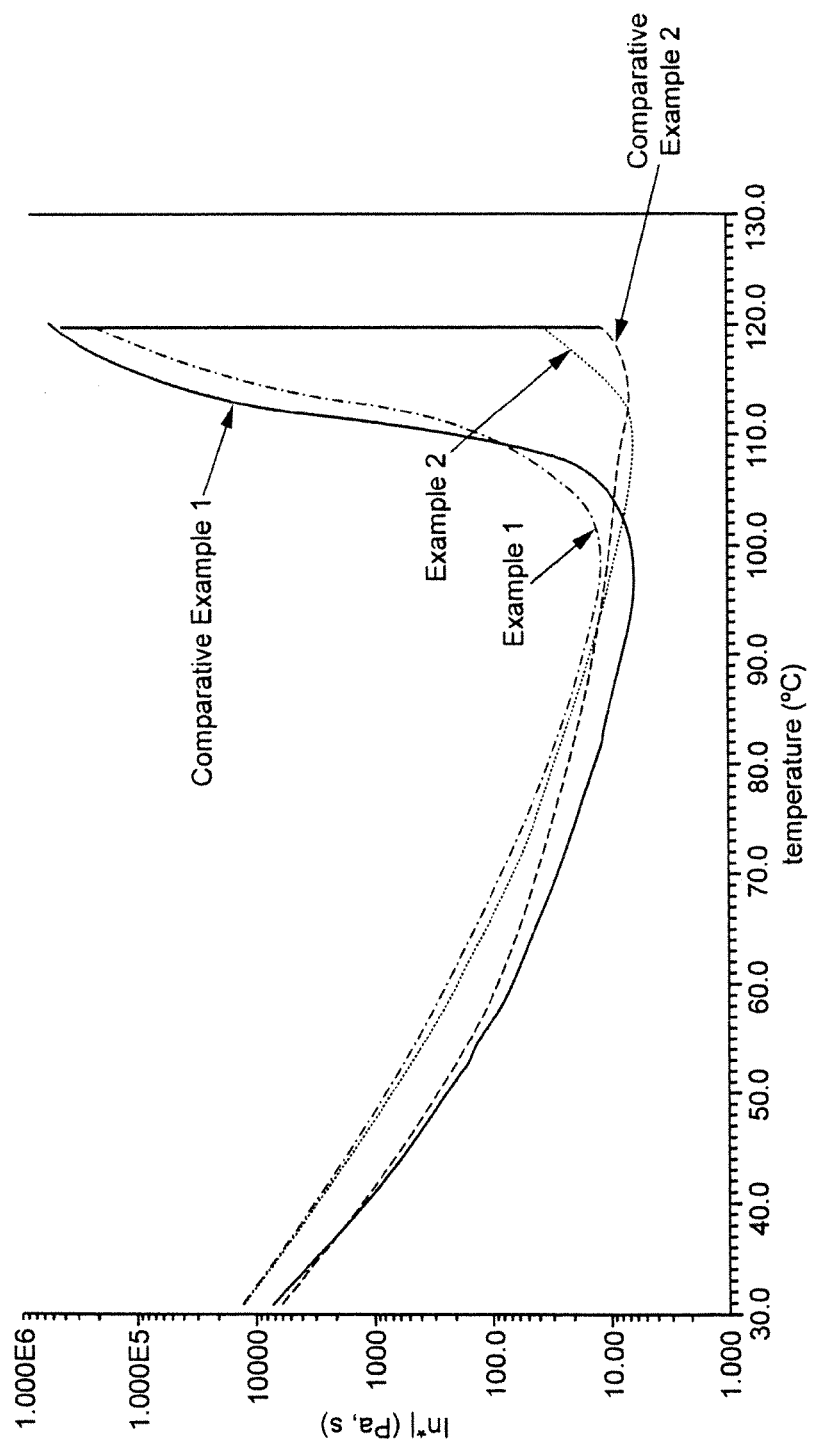
FIG. 2 is a graph showing the relationship between viscosity and temperature for a number of thermosetting resin systems according to Examples of the present invention and according to Comparative Examples not in accordance with the present invention.

FIG. 2 shows the relationship between viscosity (left-hand y-axis) and temperature (x-axis) during the curing schedule.

It may be seen from FIGS. 1 and 2 that as the temperature is increased, the viscosity of the resin decreases. The reduced resin viscosity permits the resin to flow and fully wet out and impregnate the prepreg carbon fibres. A viscosity minimum was achieved at about 99° C. The minimum viscosity was about 12.3 Pa·s.

In other preferred examples, the viscosity minimum may be achieved at 95 to 105° C. and the minimum viscosity may be 6 to 18 Pa·s, using a similar cure schedule to that used in Example 1.

After the viscosity minimum was achieved, the viscosity rapidly increased, which indicates that the resin is rapidly curing. The rapid cure ensures that the mechanical properties of the resultant cured resin are enhanced. The viscosity increased to at least 10000 Pa·s at 115° C. In other preferred examples, the viscosity may be increased to at least 10000 Pa·s in the range of 112 to 118° C.

The minimum viscosity of the mixed resin/catalyst paste system was sufficiently high to allow the resin to flow less during the early stages of the cure, which would result in less resin being lost from the prepreg. This, in turn, improves both the quality of the cured product and reduces the wasted resin.

In combination therefore, the resin system provided a desired cure schedule, to enable the product to cure as required, and resulted in both optimum wet-out/bleed and cured mechanical properties, yet avoiding any visible white residue in the cured resin. The aesthetic appearance of the cured resin was excellent, with high clarity. The resultant carbon fibre prepreg is suitable for manufacturing composite material parts for high quality cosmetic applications.

Comparative Example 1

As a control, a commercially available carbon fibre prepreg including powdered dicyandiamide catalyst was tested to determine its properties during curing. The resin of the prepreg was tested and comprised an epoxy novolac resin available in commerce from Gurit (UK) Limited under the trade name SE84LV.

Using a powder dicyandiamide as the primary curing agent, the curing of moulded composite material pieces with tight geometry indicated that white spots and white wash were visible on the curved edges. Therefore, the use of the curing system in accordance with the present invention overcame this problem of powdered dicyandiamide in known resin formulations when moulding products from carbon fibre prepregs for cosmetic applications.

The cure profile for the resin used in Comparative Example 1 is also shown in FIGS. 1 and 2. It may be seen that the cure profile of Example 1 is similar to that of Comparative Example 1 except for a higher minimum viscosity for Example 1. As discussed above, this higher minimum viscosity provides in Example 1 the advantage of reduced resin bleed out prior to curing as compared to the known resin/curing agent combination of Comparative Example 1.

However, the time to reach the minimum viscosity, and the rapid increase in viscosity thereafter, are substantially similar for Example 1 and Comparative Example 1. This indicates that Example 1 can provide a cured resin with mechanical properties similar to those of the known resin system and using a similar cure cycle, which can be readily implemented under industrial production conditions, yet avoid the visible catalyst residues.

Comparative Example 2

As a comparison to Example 1, in Comparative Example 2 the resin system used in Example 1 was modified by excluding the urea accelerator. The resin was cured and the viscosity profiles are similarly shown in FIGS. 1 and 2.

It may be seen that without the urea accelerator, during curing, prior to reaching the minimum viscosity the viscosity is at a reduced level for a longer period of time and the minimum viscosity is lower and also the minimum viscosity is achieved later in the cure cycle as compared to Example 1. This means that the resin bleed out from the prepreg, resulting in wasted resin and poor mechanical properties in the resultant composite material, is higher in Comparative Example 2 as compared to Example 1.

Furthermore, in Comparative Example 2 after the minimum resin viscosity has been achieved, the resin viscosity does not increase as rapidly as for Example 1. This means that the mechanical properties of the cured resin are lower in Comparative Example 2 as compared to Example 1.

These results show that the Dyhard Fluid VP111 curing agent was not reactive enough on its own to meet the requirements of the target cure schedule. The resin system did not cure sufficiently within the required cure schedule and the system would flow too much, resulting in a poor quality prepreg with too little resin present.

Example 2

As a comparison to Example 1, the resin system used in Example 2 was modified by including a latent urea accelerator, available in commerce under the trade name Dyhard UR800 from AlzChem AG, Germany. The resin was cured and the results are similarly shown in FIGS. 1 and 2.

A catalyst paste was prepared which comprised 80 wt % Dyhard Fluid VP111 curing agent and 20 wt % Dyhard UR800 accelerator. The weight ratio was selected to give a ratio between the cyanamide and the active hydrogen equivalent weight of the urea accelerator similar to that present in Example 1. The active hydrogen equivalent weights of the two urea accelerators were different and so the weights used correspondingly differed to provide an equivalent catalyst/accelerator active functional group ratio in Examples 1 and 2.

The Dyhard UR800 accelerator is a di-urea with an aliphatic group bonded between opposed —NH groups of respective urea-functional moieties and has the following formula:

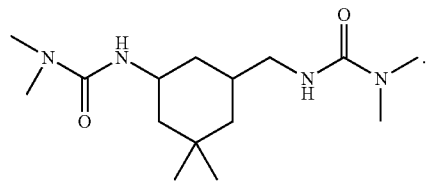

The resin blend and the catalyst paste were mixed in a weight ratio of 100 parts resin blend to 10 parts catalyst paste to form the curable epoxy resin composition for incorporation into a carbon fibre prepreg. Again, the different urea active hydrogen equivalent weight resulted in a modified resin blend/catalyst paste weight ratio so as to have a ratio between the epoxy equivalent weight/cyanamide functionality/urea active hydrogen equivalent weight similar to that present in Example 1.

It may be seen that using the urea accelerator in Example 2 rather than the urea accelerator in Example 1, although the viscosity profile was improved as compared to Comparative Example 2 which used no additional urea accelerator during curing, prior to reaching the minimum viscosity the viscosity is at a reduced level for a longer period of time and the minimum viscosity is lower and also the minimum viscosity is achieved later in the cure cycle as compared to Example 1. This means that the resin bleed out from the prepreg, resulting in wasted resin and poor mechanical properties in the resultant composite material, is higher in Example 2 as compared to Example 1.

Furthermore, in Example 2 after the minimum resin viscosity has been achieved the resin viscosity does not increase as rapidly as for Example 1. This means that the mechanical properties of the cured resin are lower in Example 3 as compared to Example 1.

It was therefore found that the latent di-urea accelerator having aliphatic functionality in Example 2 did not increase the reactivity of the mixed resin system as much as the di-urea accelerator having aromatic functionality as in Example 1, and such reduced reactivity would tend to increase the risk of undesired resin bleed out and would tend to lead to poorer mechanical properties.

Comparing the various results of the Examples and Comparative Examples, it may be seen that the addition of a urea, in particular a di-urea with aromatic functionality, for example added as Amicure UR2T powder in the formulation, as an accelerator for the liquid phase cyanamide, for example present in the Dyhard Fluid VP111 curing agent, in addition to the amino functionality within the Dyhard Fluid VP111, the reactivity of the mixed system of Example 1 was maintained when compared with the control system of Comparative Example 1 and the absence of the accelerator in Comparative Example 2. Using a different urea accelerator in Example 2, in particular a di-urea with aliphatic functionality, provided an improvement as compared to using no urea accelerator as in Comparative Example 2, but the aliphatic di-urea accelerator of Example 2 provided a less improved moulded product and moulding process as compared to Example 1 which employed a di-urea accelerator having aromatic functionality.

Various modifications to the preferred embodiments of the present invention and to the Examples of the present invention will readily be apparent to those skilled in the art and are encompassed within the scope of the present invention.

The invention claimed is:

1. A prepreg comprising at least one layer of carbon fibres and a curable thermosetting resin system, the curable thermosetting resin system at least partly impregnating the at least one layer of carbon fibres, wherein the curable thermosetting resin system comprises:
   a. a curable thermosetting resin including at least one epoxide group;
   b. a curing agent for curing the curable thermosetting resin, wherein the curing agent is present in the liquid phase and includes a cyanamide reactive group, wherein the curing agent comprises cyanamide of formula NC—NH$_2$;
   c. an accelerator for accelerating the curing of the thermosetting resin by the curing agent, wherein the accelerator includes at least one urea reactive group, wherein the accelerator comprises a substituted or unsubstituted urea of formula R$_1$R$_2$—N—CO—NR$_3$R$_4$, where R$_1$ is hydrogen or any substituted or unsubstituted aliphatic group, R$_2$ is hydrogen or any substituted or unsubstituted aliphatic, R$_3$ is hydrogen or any substituted or unsubstituted aliphatic or aromatic group, and R$_4$ is hydrogen or any substituted or unsubstituted aliphatic or aromatic group; and
   d. wherein the thermosetting resin system is formulated to have a minimum viscosity during curing of from 6 to 18 Pas at a temperature of from 95 to 105° C.

2. A prepreg according to claim 1, further including a rheology modifier for the curable thermosetting resin system, wherein the rheology modifier is at least one of a thermoplastic resin and an inorganic particulate thickener or a mixture thereof.

3. A prepreg according to claim 1 or claim 2 wherein the accelerator comprises a di-urea and R$_4$ is a urea-substituted aromatic group.

4. A prepreg according to claim 2 wherein the thermoplastic resin of the rheology modifier has a softening point within the range of from 170 to 190° C.

5. A prepreg according to claim 4 wherein the thermoplastic resin of the rheology modifier has a softening point within the range of from 175 to 185° C.

6. A prepreg according to claim 2 wherein the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof.

7. A prepreg according to claim 2 wherein the curable thermosetting resin and the thermoplastic resin of the rheology modifier are present in a weight ratio of from 90:10 to 99:1.

8. A prepreg according to claim 7 wherein the curable thermosetting resin and the thermoplastic resin of the rheology modifier are present in a weight ratio of from 93:7 to 97:3.

9. A prepreg according to claim 2 wherein the inorganic particulate thickener comprises fumed silica.

10. A prepreg according to claim 2 wherein the weight ratio of (i) the combination of the curable thermosetting resin and the thermoplastic resin of the rheology modifier and (ii) the combination of the curing agent including the cyanamide reactive group and the accelerator including the urea reactive group is from 100:5 to 100:18.

11. A prepreg according to claim 10 wherein the weight ratio of (i) the combination of the curable thermosetting resin and the thermoplastic resin of the rheology modifier and (ii) the combination of the curing agent including the cyanamide reactive group and the accelerator including the urea reactive group is from 100:10 to 100:15.

12. A prepreg according to claim 1, wherein in the urea of formula R$_1$R$_2$—N—CO—NR$_3$R$_4$, R$_1$ and R$_2$ are methyl groups, R$_3$ is hydrogen, and R$_4$ is a substituted or unsubstituted aromatic group.

13. A prepreg according to claim 1 wherein the accelerator comprises

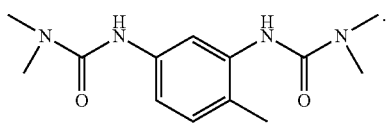

14. A prepreg according to claim 1 wherein the cyanamide curing agent and the urea accelerator are present in the curable thermosetting resin system in a molar ratio of from 1:5 to 1:20.

15. A prepreg according to claim 14 wherein the cyanamide curing agent and the urea accelerator are present in the curable thermosetting resin system in a molar ratio of from 1:10 to 1:15.

16. A prepreg according to claim 1 wherein the cyanamide curing agent and the urea accelerator are present in the curable thermosetting resin system in a weight ratio of from 2:1 to 1:10.

17. A prepreg according to claim 16 wherein the cyanamide curing agent and the urea accelerator are present in the curable thermosetting resin system in a weight ratio of from 1.5:1 to 1:7.5.

18. A prepreg according to claim 1 wherein the curable thermosetting resin is selected from at least one of an epoxy novolac resin, an epoxy cresol novolac resin and an epoxy phenol novolac resin, or a mixture of any two or more thereof.

19. A prepreg according to claim 1 wherein the curable thermosetting resin has an epoxy equivalent weight of from 230 to 250 g/equivalent weight.

20. A prepreg according to claim 1 wherein the curable thermosetting resin has a viscosity of from 80 to 90 Poise at a temperature of 85° C.

21. A prepreg according to claim 1 wherein the curing agent and the accelerator are formulated to remain in the liquid phase prior to curing of the thermosetting resin so as to avoid the presence of particles of curing agent as a separate phase within the cured thermoset resin system.

22. A prepreg according to claim 21 wherein the thermosetting resin system is formulated to have a minimum viscosity of from 10 to 14 Pas at a temperature of from 97 to 101° C.

23. A prepreg according to claim 22 wherein the thermosetting resin system is formulated to have a minimum viscosity of from 12 to 12.5 Pas at a temperature of from 98 to 100° C.

24. A prepreg according to claim 21 wherein the thermosetting resin system is formulated to have curing reactivity so that the viscosity of the thermosetting resin system is above 10000 Pas at any temperature within the range of from 112 to 118° C.

25. A prepreg according to claim 24 wherein the thermosetting resin system is formulated to have curing reactivity so that the viscosity of the thermosetting resin system is above 10000 Pas throughout the temperature range of from 115 to 118° C.

* * * * *